United States Patent
Jung et al.

(10) Patent No.: US 9,710,970 B2
(45) Date of Patent: Jul. 18, 2017

(54) METHOD AND APPARATUS FOR PROVIDING CONTENTS INCLUDING AUGMENTED REALITY INFORMATION

(71) Applicant: Samsung Electronics Co., Ltd., Suwon-si, Gyeonggi-do (KR)

(72) Inventors: Jinhe Jung, Suwon-si (KR); Taehwan Son, Suwon-si (KR); Gongwook Lee, Suwon-si (KR); Junho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 14/242,104

(22) Filed: Apr. 1, 2014

(65) Prior Publication Data

US 2014/0333667 A1  Nov. 13, 2014

(30) Foreign Application Priority Data

May 9, 2013 (KR) .................. 10-2013-0052208

(51) Int. Cl.
 *G06T 19/00* (2011.01)
 *G06T 11/00* (2006.01)

(52) U.S. Cl.
 CPC ........... *G06T 19/006* (2013.01); *G06T 11/00* (2013.01)

(58) Field of Classification Search
 CPC ....... G06T 11/00; G06T 19/006; G06T 15/20; G06T 7/0065; G06T 2207/10004; G06T 2200/24; G06T 2207/10016
 USPC ....................................................... 345/633
 See application file for complete search history.

(56) References Cited

U.S. PATENT DOCUMENTS

| | | | |
|---|---|---|---|
| 9,035,940 B2 * | 5/2015 | Ronkainen | 345/419 |
| 2009/0102859 A1 | 4/2009 | Athsani et al. | |
| 2009/0289955 A1 * | 11/2009 | Douris et al. | 345/630 |
| 2012/0019526 A1 * | 1/2012 | Jung et al. | 345/419 |
| 2012/0038669 A1 | 2/2012 | Lee et al. | |
| 2012/0164938 A1 | 6/2012 | Jeong et al. | |
| 2012/0229447 A1 * | 9/2012 | Ronkainen | 345/419 |
| 2013/0178257 A1 * | 7/2013 | Langseth | 463/4 |
| 2015/0040074 A1 * | 2/2015 | Hofmann et al. | 715/852 |
| 2015/0109337 A1 * | 4/2015 | Hofmann et al. | 345/633 |

FOREIGN PATENT DOCUMENTS

| | | |
|---|---|---|
| CN | 102436663 A | 5/2012 |
| CN | 102495959 A | 6/2012 |
| WO | 2010/079876 A1 | 7/2010 |
| WO | 2013/023705 A1 | 2/2013 |
| WO | 2013/027893 A1 | 2/2013 |

* cited by examiner

*Primary Examiner* — Michelle Chin
(74) *Attorney, Agent, or Firm* — Jefferson IP Law, LLP

(57) ABSTRACT

An augmented reality contents provision method and apparatus are provided. The method and apparatus includes generating augmented reality content by merging augmented reality information onto an image and updating the augmented reality information on the image. The method for providing a content including augmented reality information according to the present disclosure includes displaying a preview image input through a camera and the augmented reality information applied on to the preview image, capturing the preview image as an image in response to an augmented reality content creation request, and generating the augmented reality content by combining the image and the augmented reality information.

18 Claims, 16 Drawing Sheets

METHOD AND APPARATUS FOR PROVIDING CONTENTS INCLUDING AUGMENTED REALITY INFORMATION

CROSS-REFERENCE TO RELATED APPLICATION(S)

This application claims the benefit under 35 U.S.C. §119 (a) of a Korean patent application filed on May 9, 2013 in the Korean Intellectual Property Office and assigned Serial number 10-2013-0052208, the entire disclosure of which is hereby incorporated by reference.

TECHNICAL FIELD

The present disclosure relates to a method and apparatus for providing contents including augmented reality information. More particularly, the present disclosure relates to an augmented reality contents provision method and apparatus for generating augmented reality content by merging augmented reality information onto an image and updating the augmented reality information on the image.

BACKGROUND

With the advent of smart technology, the portable devices have evolved toward integrating diverse and complicated functions. Recently, research has been conducted on Augmented Reality (AR) enriching the real environment viewed through a camera with 3-Dimensional (3D) virtual information.

The current AR technology is used as nothing more than overlaying virtual information onto the preview image input through the camera. There is therefore a need of a method of managing and providing AR information more aggressively to meet the user requirements on the enhanced functionality of the mobile terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for providing contents enriched by merging the image input through a camera with Augmented Reality (AR) information.

Another aspect of the present disclosure is to provide a method and apparatus for proving contents enriched with the augmented reality information which is stored in association with an image and updated periodically.

Another aspect of the present disclosure is to provide a method and apparatus of providing augmented reality-enriched contents generated by overlaying the augmented reality information on an image in response to an image display request.

In accordance with an aspect of the present disclosure, a method for providing a content including augmented reality information is provided. The method includes displaying a preview image input through a camera and the augmented reality information applied on to the preview image, capturing the preview image as an image in response to an augmented reality content creation request, and generating the augmented reality content by combining the image and the augmented reality information.

In accordance with another aspect of the present disclosure, an apparatus providing a content including augmented reality information is provided. The apparatus includes a camera unit configured to capture an image, a display unit configured to display a preview image captured by the camera unit and the augmented reality information applied on to the preview image, and a control unit configured to capture the preview image as an image in response to an augmented reality content creation request, and to generate the augmented reality content by combining the image and the augmented reality information.

In accordance with another aspect of the present disclosure, server for providing augmented reality information is provided. The server includes a communication unit configured to communicate with an electronic device, and a control unit configured to receive a request for augmented reality information associated with a preview image captured by the electronic device, and to transmit the augmented reality information associated with the preview image captured by the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
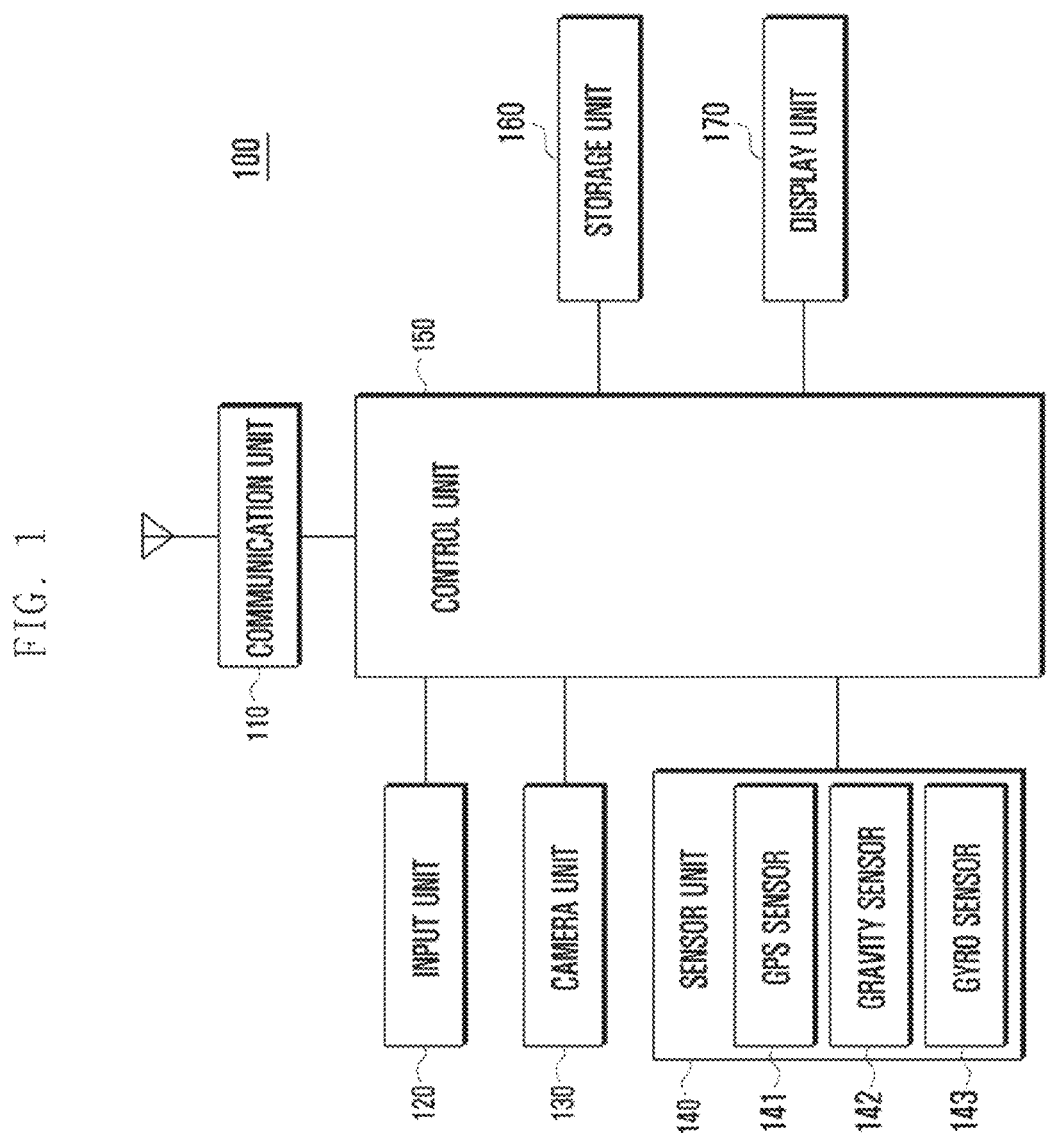
FIG. 1 is a block diagram illustrating a configuration of the mobile terminal according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure relate to controlling mobile terminal providing Augmented Reality (AR) content.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

The terminology used herein is for the purpose of describing particular embodiments only and is not intended to be limiting of the disclosure. Unless otherwise defined, all terms used herein have the same meaning as commonly understood by one of ordinary skill in the art to which this disclosure pertains, and should not be interpreted as having an excessively comprehensive meaning nor as having an excessively contracted meaning. If technical terms used herein is erroneous that fails to accurately express the technical idea of the present disclosure, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Herein after, various embodiments of the present disclosure are described in detail with reference to accompanying drawings.

FIG. 1 is a block diagram illustrating a configuration of the mobile terminal according to an embodiment of the present disclosure.

According to various embodiments of the present disclosure, the mobile terminal 100 may be an electronic device.

Referring to FIG. 1, the mobile terminal 100 includes a communication unit 110, an input unit 120, a camera unit 130, a sensor unit 140, a control unit 150, a storage unit 160, and a display unit 170.

The communication unit 110 is responsible for data communication with the outside. The communication unit 110 may include a transmitter for up-converting and amplifying the transmission signal and a receiver for low noise amplifying and down-converting the received signal.

According to various embodiments of the present disclosure, the communication unit 110 may exchange AR information with a server. The communication unit 110 may transmit an AR information request or updated AR information request to the server. The communication unit 110 also may receive the AR information or update push from the server.

If a user input is detected, the input unit 120 generates an input signal corresponding to the user input to the control unit 130. The input unit 120 may be implemented with at least one of a button, a jog dial, a wheel, a touch sensor, an electromagnetic sensor, a proximity sensor, an IR sensor, and/or the like to detect a user input made with a part of human body, a pen, and/or the like.

The input unit 120 may be implemented with an input pad. The input unit 120 may be implemented with various sensors mounted on the input pad. The input unit 120 also may be implemented with a touch sensor laminated on the surface of input pad in the form of a film or panel. The input unit 120 may be implemented with an Electro Magnetic Resonance (EMR) or Electro Magnetic Interference (EMI) type input pad using an electromagnetic sensor. The input unit 120 may be implemented in the form of at least one layered sensor for detecting any input using a plurality of sensors.

The input unit 120 may be implemented in the form of input screen layered on the surface of the screen of the display unit 170. For example, the input unit 120 may include an input pad having a touch sensor and a Touch Screen Panel (TSP) combined with the display unit 170.

According to various embodiments of the present disclosure, the input unit 120 may detect an AR content generation request, an edit request (e.g., a request to add AR information, a request to delete AR information, or the like), an AR content display request, and/or the like.

The camera unit 130 may frame an image including at least one object and sends the data signals converted from the image to the control unit 150. The control unit 150 may recognize a specific object in the image based on the data signals received from the camera unit 130 or control the display unit 170 to display the image in preview. If a shooting request is detected, the control unit 150 may process the image into a picture. The control unit 150 may store the picture in the storage unit 160 temporarily or semi-persistently.

The sensor unit 140 may include a plurality of sensors for detecting the current state of the mobile terminal 100. For example, the sensor unit 140 may detect contextual information relating to the mobile terminal 100. The sensor unit 140 generates a control signal corresponding to the current state of the mobile terminal to the control unit 150.

According to various embodiments of the present disclosure, the sensor unit 140 includes a Global Positioning System (GPS) sensor 141, a gravity sensor 142, a gyro sensor 143, and/or the like.

The GPS sensor 141 generates the location information of the mobile terminal 100. For example, the GPS sensor 141 generates the location information of the mobile terminal 100 based on the GPS signals received from the GPS satellites through the communication unit 110. The GPS sensor 141 may determine the latitude, longitude, and altitude of the mobile terminal 100 through triangulation based on the GPS signals received from the GPS satellites.

The gravity sensor 142 detects the gravity. The gravity sensor is capable of determining the tilt of the mobile terminal 100 based on the detected gravity and acceleration direction or the orientation of the mobile terminal 100 based on the electromagnetic field around the mobile terminal. The gravity sensor 142 is similar to the electromagnetic sensor in that the orientation is detected based on the electromagnetism.

The gyro sensor 143 may measure the rotation angle of the mobile terminal 100 and may detect the rotated angle based on the 3-dimensional reference axis. For example, the gyro sensor may detect the rotation angles on the x, y, and z axes centered around the mobile terminal 100 (e.g., pitch, roll, yaw, and/or the like).

The control unit 150 may control the communication unit 110 to transmit the information acquired by the sensor unit 140 to a server for use in generating the AR information.

The control unit 150 may control the components of the mobile terminal 100. For example, the control unit 150 may control the components of the mobile terminal 100 to generate and manage the AR content.

According to various embodiments of the present disclosure, the control unit 150 may process the preview image input through the camera unit 130 into a picture and may generate the AR content by merging the picture with the AR information.

The control unit 150 may request the server for the (updated) AR information in response to the AR content display request and update push from the server and update the AR content with the received AR information.

According to various embodiments of the present disclosure, the control unit 150 may control the display unit 170 to display the AR content and update the AR content with a newly updated version in response to a selection input at a certain time.

The operations of the control unit 150 are described hereinafter in more detail with reference to accompanying drawings.

The storage unit 160 may store the programs and/or commands for used in the mobile terminal 100. The control unit 150 may execute the programs and/or commands stored in the storage unit 160.

The storage unit 160 may include at least one of flash memory card, hard disk, micro multimedia card (e.g. SD and XD card), Random Access Memory (RAM), Static RAM (SRAM), Read-Only Memory (ROM), Electrically Erasable Programmable ROM (EEPROM), Programmable ROM (PROM), magnetic memory, magnetic disk, optical disk, and/or the like.

According to various embodiment of the present disclosure, the storage unit 160 may store at least one AR content item. The storage unit 160 also may store the information on the AR content creation/update time.

The display unit 170 may display (output) the information processed in the mobile terminal 100. For example, the display unit 170 may display the information corresponding to the currently running application, program, or service on the User Interface (UI).

The display unit 170 may be implemented with one of a Liquid Crystal Display (LCD), a Thin Film Transistor LCD (TFT LCD), an Organic Light Emitting Diodes (OLED), a flexible display, a 3D display, and/or the like.

The display unit 170 may be implemented in the form of a touchscreen with a layered structure of the touch sensor and/or electromagnetic sensor as a part of the input unit 120.

According to various embodiments of the present disclosure, the touchscreen-enabled display unit 170 may be used for the input function.

According to various embodiments of the present disclosure, the display unit 170 may display the AR content list and/or AR content under the control of the control unit 150.

Although FIG. 1 is depicted with specific components, according to various embodiments of the present disclosure, the mobile terminal 100 may be implemented with or without at least one of aforementioned components and equivalents thereof.

Figure 2:
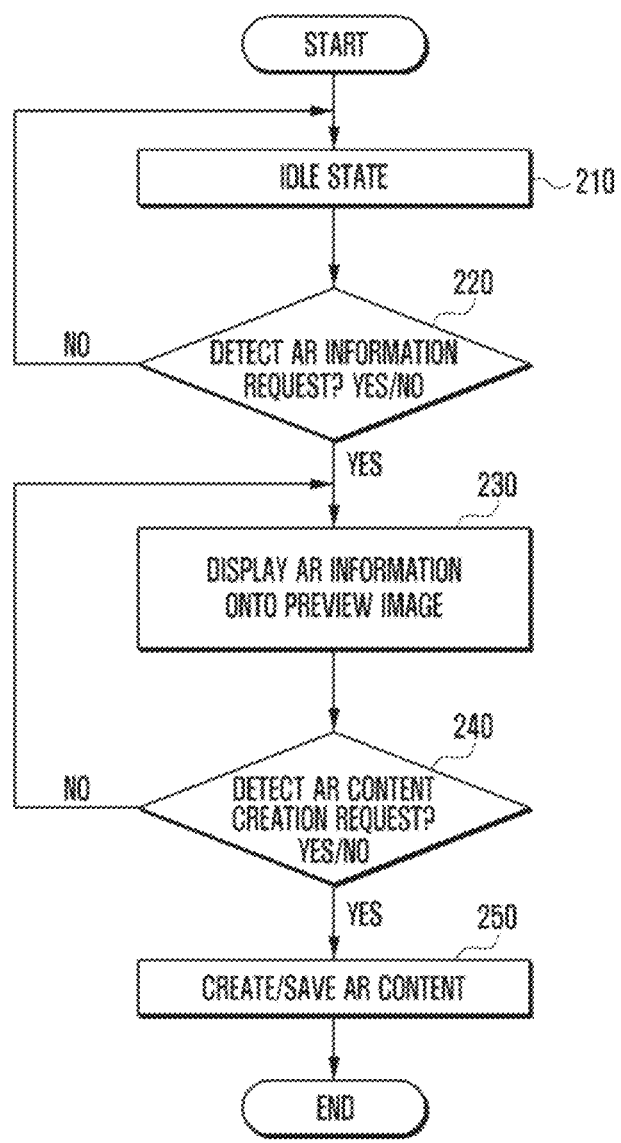
FIG. 2 is a flowchart illustrating a procedure of creating Augmented Reality (AR) content according to an embodiment of the present disclosure.

FIG. 2 is a flowchart illustrating a procedure of creating AR content according to an embodiment of the present disclosure.

Referring to FIG. 2, at operation 210, the control unit 150 may check that the mobile terminal 100 is in the idle state.

The control unit 150 may control the mobile terminal 100 in the idle state. The control unit 150 may execute an application, a program, a service, and/or the like in the idle state.

At operation 220, the control unit 150 may determine whether an AR information request is detected. For example, the idle state, the control unit 150 monitors to determine whether an AR information request is detected.

According to various embodiments of the present disclosure, the control unit 150 may determine whether the user inputs AR information request by means of the input unit 120. According to various embodiments of the present disclosure, the control unit 150 may receive the data corresponding to the AR information request through the communication unit 110. According to various embodiments of the present disclosure, the control unit 150 may determine whether any AR request information is generated by a program, a service, an application, and/or the like.

According to various embodiments of the present disclosure, the AR information request may be a request for executing a camera application, an AR application, and/or the like. The application may be stored in the storage unit 160 or may downloaded by means of the communication unit 110.

If the control unit 150 determines that no AR information request is detected at operation 220, then the control unit 150 may return to operation 210. For example, if the control unit 150 determines that no AR information request is detected, then the control unit 150 may control the mobile terminal 100 to remain in the idle state.

If the control unit 150 determines that the AR information request is detected at operation 220, then the control unit 150 may proceed to operation 230 at which the control unit 150 merges the AR information onto the preview image to display the AR image.

According to various embodiments of the present disclosure, the control unit 150 may activate the camera unit 130 in response to the detection of the AR information request. According to various embodiments of the present disclosure, the control unit 150 may control the display unit 170 to display the AR image generated by merging the AR information onto the image input through the camera unit 130.

Figure 3:
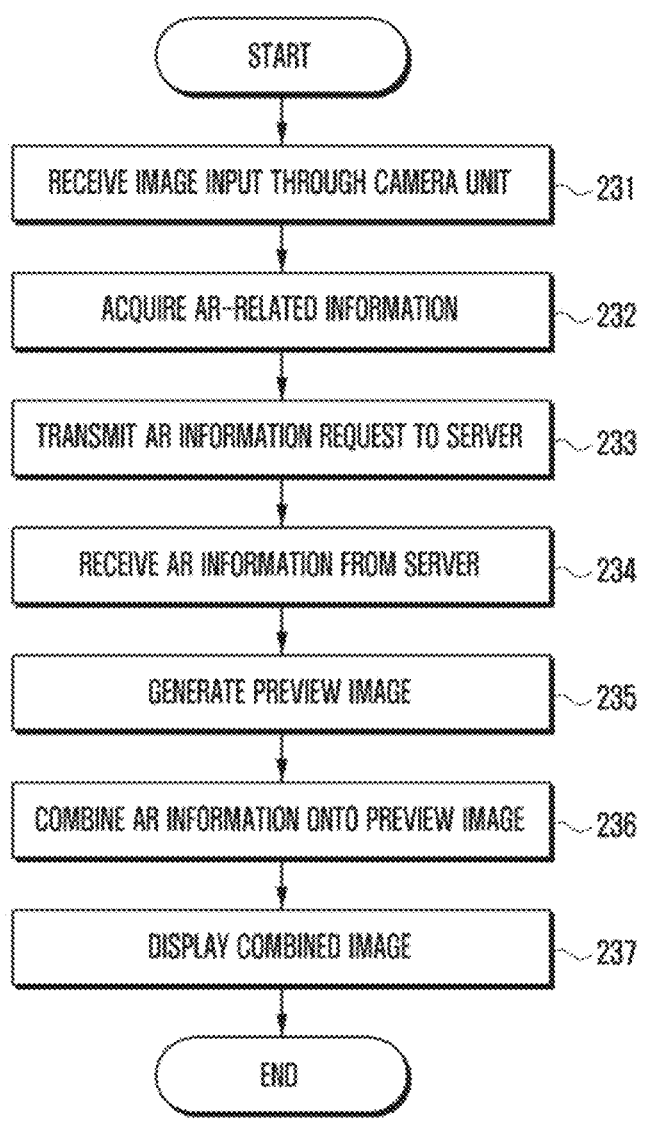
FIG. 3 is a flowchart illustrating a procedure of creating AR content by combining AR information onto a preview image according to an embodiment of the present disclosure.

FIG. 3 is a flowchart illustrating a procedure of creating AR content by combining AR information onto the preview image according to an embodiment of the present disclosure.

Referring to FIG. 3, at operation 231, the control unit 150 may collect the image by means of the camera unit 130. For example, at operation 231, the control unit 150 may receive an image input through (e.g., captured by) the camera unit 130.

The control unit 150 may send the control signal to the camera unit 130 to take an image. The camera unit 130 may drive the camera in response to the control signal and may send the image including at least one object to the control unit 150. The image captured by the camera unit 130 may include at least one object.

Figure 4:
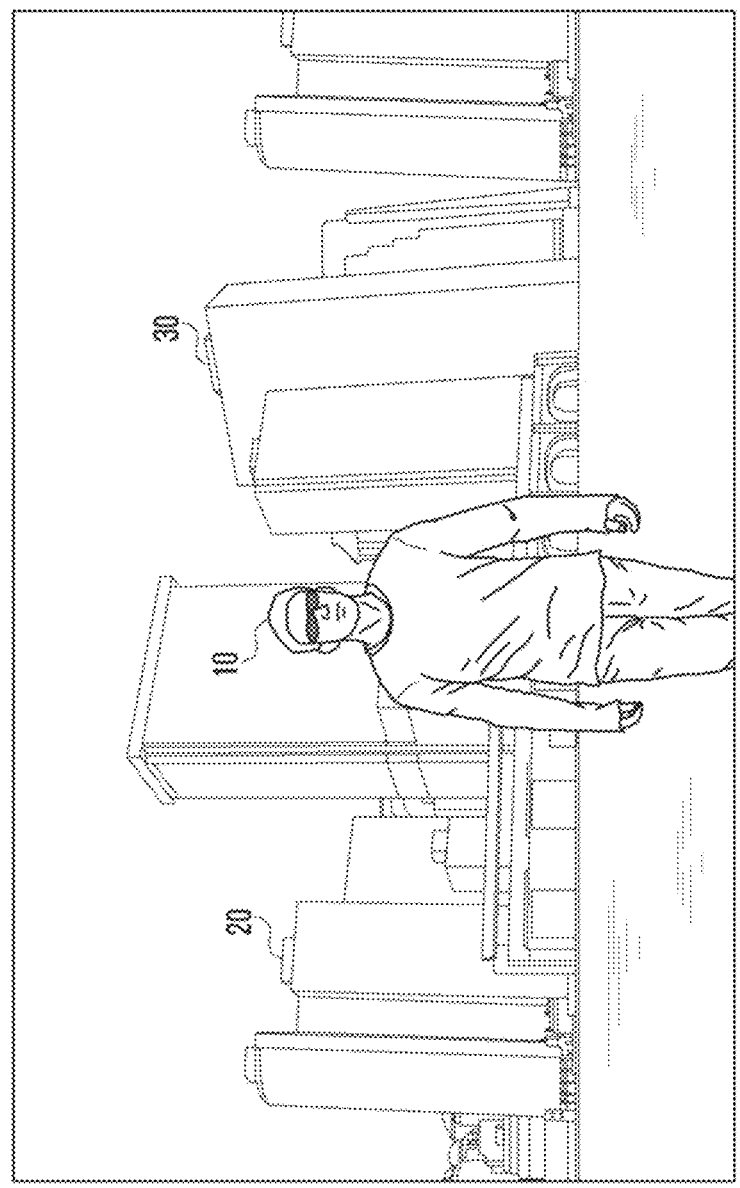
FIG. 4 is a diagram illustrating a screen display of an image taken by a camera unit such as, for example, the camera unit of FIG. 1 according to an embodiment of the present disclosure.

FIG. 4 is a diagram illustrating a screen display of an image taken by a camera unit such as, for example, the camera unit of FIG. 1 according to an embodiment of the present disclosure.

Referring to FIG. 4, the image includes a person 10 and a plurality of buildings 20 and 30 as objects.

At operation 232, the control unit 150 may acquire the AR-related information.

According to various embodiments of the present disclosure, the control unit 150 may collect the AR-related information as the information necessary for acquiring the AR information.

According to various embodiments of the present disclosure, the control unit 150 may recognize at least one object in the image input through the camera unit 130 and may process the object as the AR-related information. According to various embodiments of the present disclosure, the control unit 150 may extract the object using a face recognition algorithm, a feature extraction algorithm, a color detection algorithm, a contour extraction algorithm, and/or the like. The control unit 150 may recognize an object as a target providing the AR information. The information on the object as the target of providing the AR information may be processed based on the data input by the user or received from the server and then stored in the storage unit 160.

According to various embodiments of the present disclosure, the object as the target of providing the AR information may be any of text, a person, a building, a natural object, a barcode, a QR code, a book, a movie poster, and/or the like.

Referring to the screen display of FIG. 4, the control unit 150 may recognize the person 10 and buildings 20 and 30 as the AR information provision targets and may generate the AR-relation information on at least one of the person 10 and the buildings 20 and 30.

For example, the control unit 150 may collect the state information on the terminal by means of the sensor unit 140 and acquires AR-related information therefrom. The control unit 150 may acquire the location information, latitude/longitude information, and tilt/gravity direction information using various sensors.

According to various embodiments of the present disclosure, the AR-related information acquired by the control unit 150 is not limited to the aforementioned information.

At operation 233, the control unit 150 may send the server an AR information request.

The control unit 150 may control the communication unit 110 to transmit the AR information request to the server which provides the AR information. The AR information request may include the AR-related information acquired by the control unit 150 such as the object information extracted from the image, GPS information, tilt/gravity direction information, and/or the like.

As an example, with reference to FIG. 4, the control unit 150 may send the server the information on at least one of the person 10, and buildings 20 and 30 recognized in the image. The control unit 150 may send the server the GPS information, tilt/gravity direction information, and/or the like of the mobile terminal 100.

At operation 234, the control unit receives the AR information from the server.

The control unit 150 may receive the AR information in response to the AR information request through the communication unit 110. For example, the control unit 150 may receive AR information transmitted by the server in response to the AR information request communicated by the control unit 150.

According to various embodiments of the present disclosure, the server may correspond to the AR information provision server which stores AR informations corresponding to the AR-related information.

If the AR-related information is received from the mobile terminal 100, the server analyzes the AR-related information. As an example, referring to the screen display of FIG. 4, the server may analyze the information on at least one of the person 10 and the buildings 20 and 30, GPS information of the mobile terminal 100, tilt/gravity direction information, and/or the like. The server may identify the person 10 recognized by the control unit 150 as Brad Pitt according to the analysis result. The server also may identify the buildings 20 and 30 recognized by the control unit 150 as City hall and X-mart respectively.

The server may extract the AR information corresponding to the AR-related information based on the analysis result. The AR information may include text, an image, application information, a webpage, and/or the like related to the object as the target of providing the AR information.

Referring to the screen display of FIG. 4, the server may extract the information on the Facebook webpage of Brad Pitt as the AR information corresponding to the person 10. The server also may extract the text information of City hall as the information on the building 20. The server also may extract the text including the discount information of the X-mart as the information on the building 30.

If the AR information is received from the server at operation 234, then at operation 235, the control unit 150 may control to display a preview image input through the camera unit 130.

The control unit 150 may process the image data into the preview image fit for the display unit 170 in size and resolution.

At operation 236, the control unit 150 may merge the AR information onto the preview image.

The control unit 150 may merge the AR information received from the server onto the preview image.

At operation 237, the control unit 150 may control the display unit 170 to display the merged image.

The control unit 150 may control the display unit 170 to display the final image generated by merging the AR information onto the preview image.

Figure 5:
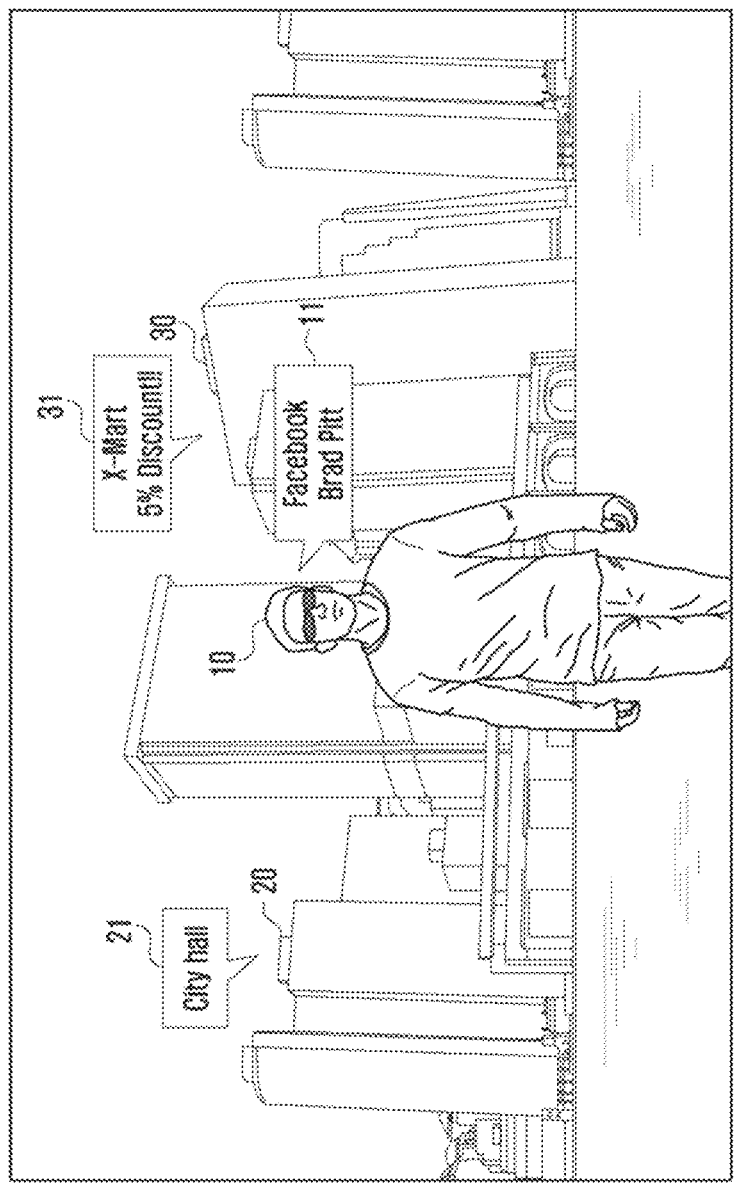
FIG. 5 is a diagram illustrating a screen display of a final image generated by merging AR information onto a preview image according to an embodiment of the present disclosure.

FIG. 5 is a diagram illustrating a screen display of a final image generated by merging AR information onto preview image according to an embodiment of the present disclosure.

Referring to FIG. 5, the control unit 150 may generate the final AR image of FIG. 5 by merging AR information 11 corresponding to the person 10, AR information 21 corresponding to the building 20, and AR information 31 corresponding to the building 30 onto the preview image input of FIG. 4.

Returning to FIG. 2, after displaying the AR image generated by merging the AR information onto the preview image, at operation 240, the control unit 150 may monitor to determine whether an AR content creation request is detected.

The control unit 150 may determine whether an AR content creation request is input by the user or generated by an application, a program, a service, and/or the like.

According to various embodiments of the present disclosure, the AR content creation request may be a selection, a creation request, a save request and/or the like made through the user interface. The AR content creation request also may be an image capturing request of a camera application.

If the control unit 150 determines that no AR content creation request is detected at operation 240, then the control unit 150 may return to operation 230 at which the control unit 150 may control the display unit 170 to display the AR image generated by merging the AR information onto the preview image input through the camera unit 130 in real time.

If the control unit 150 determines that the AR content creation request is detected at operation 240, then the control unit 150 may proceed to operation 250 at which the control unit 150 creates and saves the AR content.

According to various embodiments of the present disclosure, the AR content denotes the content composed of the image displayed as the preview image and the virtual information included in the image. The virtual information included in AR content may be updated according to the user request or virtual reality information provider's intention.

According to various embodiments of the present disclosure, the AR content may include image, context, template information, and/or the like.

The image may be the visual data input through the camera 130 (e.g., the preview image).

The context may be the content of the information to be provided to the user through the AR service. The context may include the information on at least one of text, an image, an application, a webpage associated with the text, a person, a building, a book, a movie, music, a place, a barcode, a QR code, and/or the like. The AR information may include a plurality of contexts as many as the number of objects as the targets of providing the AR information.

The template may include the information about the position on the image to be displayed along with the AR information (e.g., the image input through the camera 120). The template may include the information on the display region at which the text is merged (e.g., the information on the control). The control may include frame image, background image, area size information, and/or the like. The template as the information on the control may include the type of control, instance, position, and context ID corresponding to the control.

The control unit 150 may generate the above-described AR content.

Figure 6:
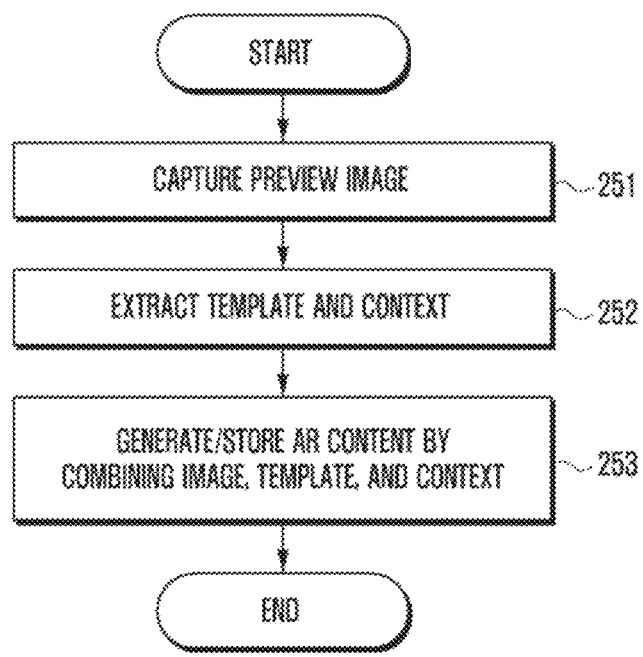
FIG. 6 is a flowchart illustrating a procedure of creating AR content based on a preview image according to an embodiment of the present disclosure.

FIG. 6 is a flowchart illustrating a procedure of creating AR content based on a preview image according to an embodiment of the present disclosure.

Referring to FIG. 6, at operation 251, the control unit 150 may capture the preview image.

The control unit 150 may generate a picture by processing the image input through the camera unit 120 (e.g., the preview image), at the time when the AR content creation request is detected. The control unit 150 may store the picture in the storage unit 160 temporarily or semi-consistently.

The control unit 150 may generate the picture by processing the image input through the camera 120 as illustrated in the screen display of FIG. 4.

At operation 252, the control unit 150 may extract the template and context.

The control unit 150 may extract the template and context corresponding to the preview image. The control unit 150 may extract the template and context based on the AR information acquired in correspondence to the preview image. The template may include the control identifiers corresponding to the respective AR information, control types, coordinates of the control display position, context identifiers corresponding to the respective controls, and/or the like in the form of a table. The context also may include the context identifiers, context types, context descriptors (data on corresponding AR information), image storage paths, context display control identifiers, and/or the like in the form of a table.

The control unit 150 also may extract the time when the template and context are acquired or the time when the AR information is acquired. In the case that the AR information has a timestamp, the control unit 150 may extract the time stamp corresponding to the AR information. The time stamp may correspond to the time when the server has created the AR information.

The control unit 150 may extract a template including virtual reality information and text balloons 11, 21, and 31 as controls for presenting the virtual reality information from the AR image as illustrated in the screen display of FIG. 5. The template may be expressed in the form of a table as exemplified by Table 1.

TABLE 1

| control ID | control type | control position | context ID |
|---|---|---|---|
| 11 | bubble | (10, 5) | 11 |
| 21 | bubble | (3, 13) | 21 |
| 31 | bubble | (12, 10) | 31 |

Referring to the screen display of FIG. 5, the control unit 150 may extract the text information corresponding to person, Facebook application information of the person, building information, sale information associated with the building, and/or the like from the image of the screen display of FIG. 5. The context of the image of the screen display of FIG. 5 may be expressed in the form of a table as exemplified by Table 2.

TABLE 2

| context ID | context type | context substance | control ID |
|---|---|---|---|
| 11 | application | facebook_Brad Pitt | 11 |
| 21 | location | City hall | 21 |
| 31 | text | X-Mart 5% Discount | 31 |

Figure 7:
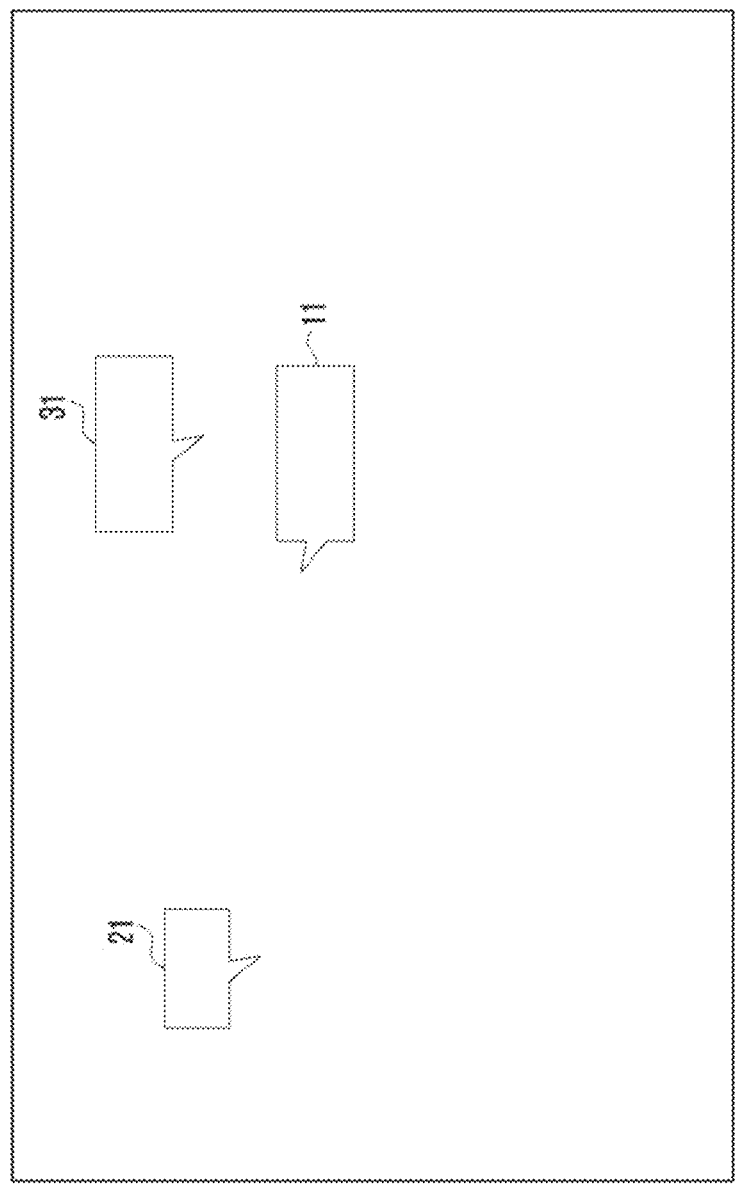
FIG. 7 is a diagram illustrating a template for use in creating AR content according to an embodiment of the present disclosure.

FIG. 7 is a diagram illustrating a template for use in creating AR content according to an embodiment of the present disclosure.

Referring to FIG. 7, the template may include virtual reality information and text balloons 11, 21, and 31 as controls for presenting the virtual reality information from the AR image as illustrated in the screen display of FIG. 5.

At operation 253, the control unit 150 may create the AR content by associating the image, the template, and the context.

The control unit 150 may generate the AR content by associating the template and the context with the image. The control unit 150 may store the image data in association with the information on the template and context in the form of AR content.

The control unit 150 may record the time information related to the AR content. The time information may correspond to the time when the AR content template and context are received and/or composed, or the time when the AR content is created. The control unit 150 may record the time information about a plurality of AR content to store AR content in a temporal order and manage the history of the AR content.

The control unit 150 may store the generated AR content in the storage unit 160 temporarily or semi-persistently. The control unit 150 also may transmit the information on the AR content to the AR content server which manages the information on the AR content of the mobile terminal 100.

According to various embodiments of the present disclosure, the control unit 250 may control the display unit 170 to display the AR content as illustrated in FIG. 5.

A description is made of the procedure of updating the generated AR content according to various embodiments of the present disclosure in detail hereinafter.

Figure 8:
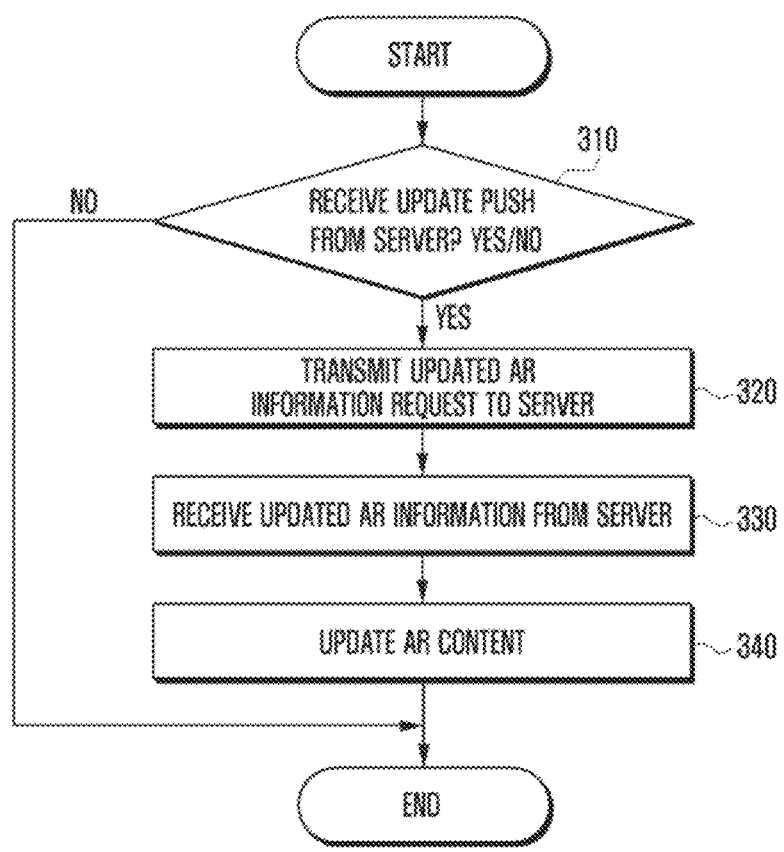
FIG. 8 is a flowchart illustrating an AR content update procedure of AR content provision method according to an embodiment of the present disclosure.

FIG. 8 is a flowchart illustrating an AR content update procedure of an AR content provision method according to an embodiment of the present disclosure.

Referring to FIG. 8, at operation 310, the control unit 150 may determine whether an update push is received from a server.

The server may provide the AR information update push service for the AR content according to the policy of the AR information provider. In this case, the server may store and manage the information on the AR content stored in the mobile terminal 100. If certain AR information is updated, the server may send a push notification to the mobile terminal 100 using the AR content corresponding to the AR information to notify of the update of the AR information.

Referring to the screen display of FIG. 5, if the sale information of the X-Mart is changed, the server may send a push notification to the mobile terminal 100 storing the AR content including the sale information of X-Mart for notifying the update of the AR information of the X-Mart. Referring to the screen display of FIG. 5, if a new text is posted on the Facebook page of Brad Pitt, the server may send a push notification to the mobile terminal 100 storing the AR content including the Facebook information of the Brad Pitt.

The control unit 150 may determine whether the update push is received through the communication unit 110.

If the control unit 150 determines that the update push is not received from the server at operation 310, then the control unit 150 may end the AR content update procedure.

If the control unit 150 determines that the update push is received from the server at operation 310, then the control unit 150 may proceed to operation 320 at which the control unit 150 may transmit the updated AR information request to the server.

The control unit 150 may control the communication unit 110 to transmit the AR information request to the AR information provision server. The AR information request may include information on the update push received from the server, AR content information, and information on the AR information to be updated.

Referring to the screen display of FIG. 5, if an update push notifying of the change in sale information of X-mart is received, the control unit 150 may send the server an updated AR information request.

At operation 330, the control unit 150 may receive the updated AR information from the server.

If the AR-related information is received from the mobile terminal 100, the server 150 may retrieve and send the updated AR information to the mobile terminal 100 in response to the request. The control unit 150 may receive the updated AR information from the server by means of the communication unit 110.

Referring to the screen display of FIG. 5, the control unit 150 may receive the information on the text including the changed sale information of the X-mart and/or information on the updated Facebook page of the Brad Pitt.

If the AR information is received from the server, then at operation 340, the control unit 150 may update the AR content based on the received AR information.

According to various embodiments of the present disclosure, the control unit 150 may extract the template and context from the received AR information. The control unit 150 also may load the AR content corresponding to the AR information and change the template and context constituting the AR content for the received template and context to update the AR content.

According to various embodiments of the present disclosure, the control unit 150 may generate a new AR content based on the receive AR information to update the AR content. In detail, the control unit 150 may extract an image from the AR content, and the template and context from the AR information. The control unit 150 may generate an updated AR content based on the extracted image, template, and context.

Referring to a screen display of FIG. 5, the control unit 150 may update the context on the person 10 of the AR content with the updated Facebook page information. The control unit 150 also may update the context on the building 20 with the updated sale information.

According to various embodiments of the present disclosure, the case of updating the AR content, the control unit 150 may retain the old templates, contexts, AR contents, and/or the like even after the update rather than delete the old templates, contexts, AR contents, and/or the like. For example, the control unit 150 may generate the AR content based on the updated AR information and store the AR content. The control unit 150 also may record the creation times and update times of AR contents. The content created based on the updated AR information may be handled as the updated version of the corresponding AR content. By storing the AR content updated repeatedly along with update times information, the control unit 150 can manage the update history of the AR content.

When the AR content is updated, the control unit 150 may count the number of updates and record and manage the update count and update times.

The above-described AR content update procedure may be referred to as a download-based update procedure.

Figure 9:
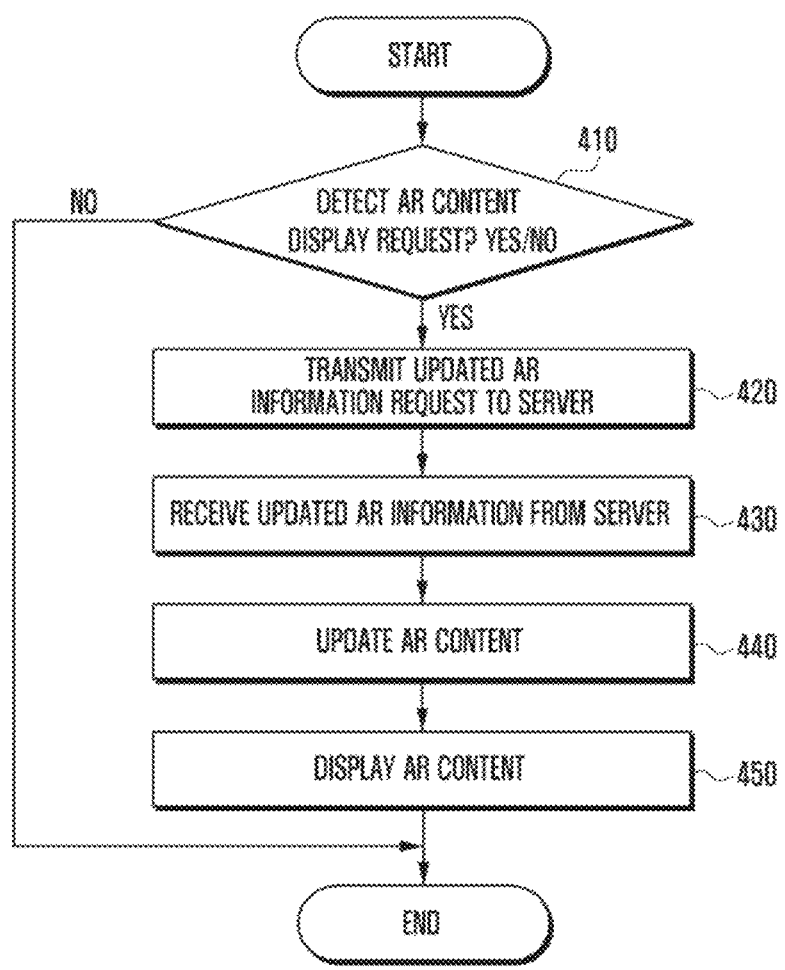
FIG. 9 is a flowchart illustrating an AR content update procedure of an AR content provision method according to an embodiment of the present disclosure.

FIG. 9 is a flowchart illustrating an AR content update procedure of an AR content provision method according to an embodiment of the present disclosure.

Referring to FIG. 9, at operation 410, the control unit 150 may monitor to determine whether an AR content display request is detected.

The AR content display request may be clarified in the following description on the AR content display procedure.

If the control unit 150 determines that an AR content display request is not detected at operation 410, then the control unit 150 may end the AR content provision method.

If the control unit 150 determines the AR content display request is detected at operation 410, then the control unit 150 may proceed to operation 420 at which the control unit 150 may send the server an updated AR information request.

The control unit 150 may control the communication unit 110 to transmit the request for the information on the updated AR content to the server upon detection of the AR content display request. The AR information request may include AR content information and information on the AR information as a target of update.

If the AR content display request corresponding to the AR content as illustrated in the screen display of FIG. 5 is detected, then the control unit 150 may send the server the updated AR information request including the information on the corresponding AR content.

At operation 430, the control unit 150 may receive the updated AR information from the server.

If the AR content information is received from the mobile terminal 100, then the server may search for the updated AR information corresponding to the request and transmit the updated AR information to the mobile terminal 100. If the AR information has updated several times before the receipt of the updated AR information request, then the server may send the mobile terminal 100 the information on the number of updates and updated times along with the updated AR information.

Referring to the screen display of FIG. 5, the mobile terminal 100 may receive the text including the changed sale information of the X-mart and/or the information on the updated Facebook page of the Brad Pitt.

If the AR information is received from the server at operation 430, then at operation 440, the control unit 150 may update the AR content.

The control unit 150 may extract the template and context from the received AR information. The control unit 150 may load the AR content corresponding to the AR information and update the template and context constituting the AR content with the received template and context. According to various embodiments of the present disclosure, the AR content update procedure may be performed as illustrated in FIG. 9. At this time, the control unit 150 may record and manage the information on the number of updates and update times.

Referring to the screen display of FIG. 5, the control unit 140 may change the context on the person 10 of the AR content for the updated Facebook page information. The control unit 140 also may change the context on the building 20 for the updated sale information.

In the case of updating the AR content, the control unit 150 may retain the old templates, contexts, AR contents, and/or the like even after the update rather than delete the old templates, contexts, and AR contents. The control unit 150 may record the repetitive updates of the AR content to manage the update history of the AR content. At this time, the control unit 150 may record the update times of the AR content.

At operation 450, the control unit 150 may display the AR content.

The control unit 150 may control the display unit 170 to display the AR content in response to the AR content display request. The AR content display procedure is described in detail hereinafter.

The above-described AR content update procedure may be referred to as streaming-based update procedure.

A description is made of the procedure of displaying the AR content generated and updated in the above manners hereinafter in detail.

Figure 10:
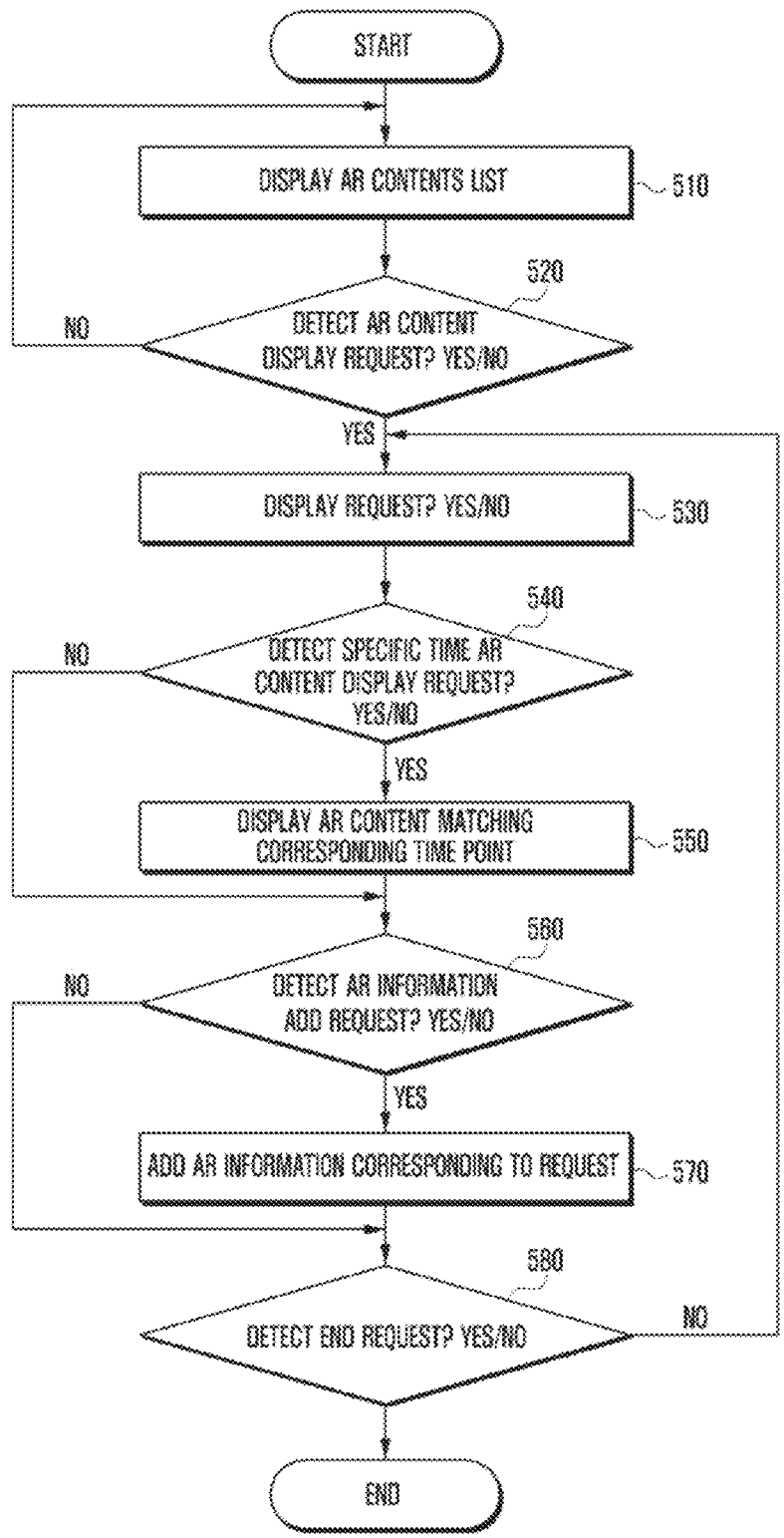
FIG. 10 is a flowchart illustrating a content display procedure of an AR content provision method according to an embodiment of the present disclosure.

FIG. 10 is a flowchart illustrating a content display procedure of an AR content provision method according to an embodiment of the present disclosure.

Referring to FIG. 10, at operation 510, the control unit 150 may display a list of AR content.

The control unit may detect a request for displaying the AR content list. The list display request may correspond to the execution of an AR content viewer application or an image view application.

Figure 11:
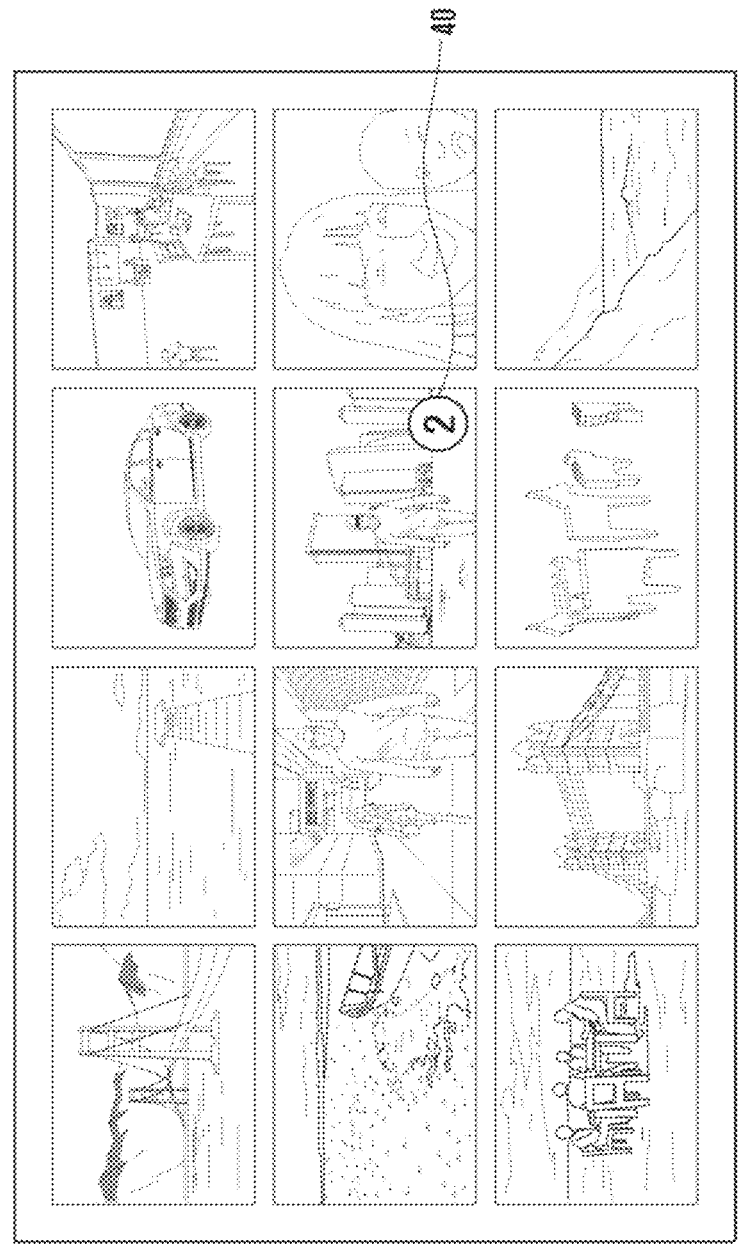
FIG. 11 is a diagram illustrating a screen display showing AR content list in a form of thumbnails according to an embodiment of the present disclosure.

FIG. 11 is a diagram illustrating a screen display showing an AR content list in a form of thumbnails according to an embodiment of the present disclosure.

Referring to FIG. 11, if the list display request is detected, then the control unit 150 may display the list of the AR contents stored in the storage unit 160. The control unit 150 may extract the images constituting the AR contents to generate the list to be displayed. The control unit 150 may extract only the images constituting the AR contents to generate the list to be displayed. The control unit 150 may generate the list in the form of thumbnails as illustrated in FIG. 11.

According to various embodiments of the present disclosure, the control unit 150 may display the updated information on the AR content list. If the AR contents have been updated according to the procedure of FIG. 8 or 9 before displaying the AR content list, then the control unit 150 may store the information on the number of updates and update times of the content. The control unit 150 may display the update information on the AR content along with the AR content list. As illustrated in the screen display of FIG. 11, the control unit 150 may present the number of updates of the AR content on the corresponding item of the list as denoted by reference number 40.

At operation 520, the control unit 150 may monitor to determine whether an AR content display request is detected.

The AR content display request may be generated in response to an input made with a touch gesture, a proximity gesture, a hovering gesture, and/or the like to a certain AR content item on the list.

If the control unit 150 determines that the AR content display request is not detected at operation 520, then the control unit 150 may return to operation 510.

If the control unit 150 determines that the AR content display request is detected at operation 520, then the control unit 150 may proceed to operation 530 at which the control unit 150 may display the AR content.

The control unit 150 may control the display unit 170 to display the AR content in response to the request. The control unit 150 may arrange the template to the image constituting the AR content.

Figure 12:
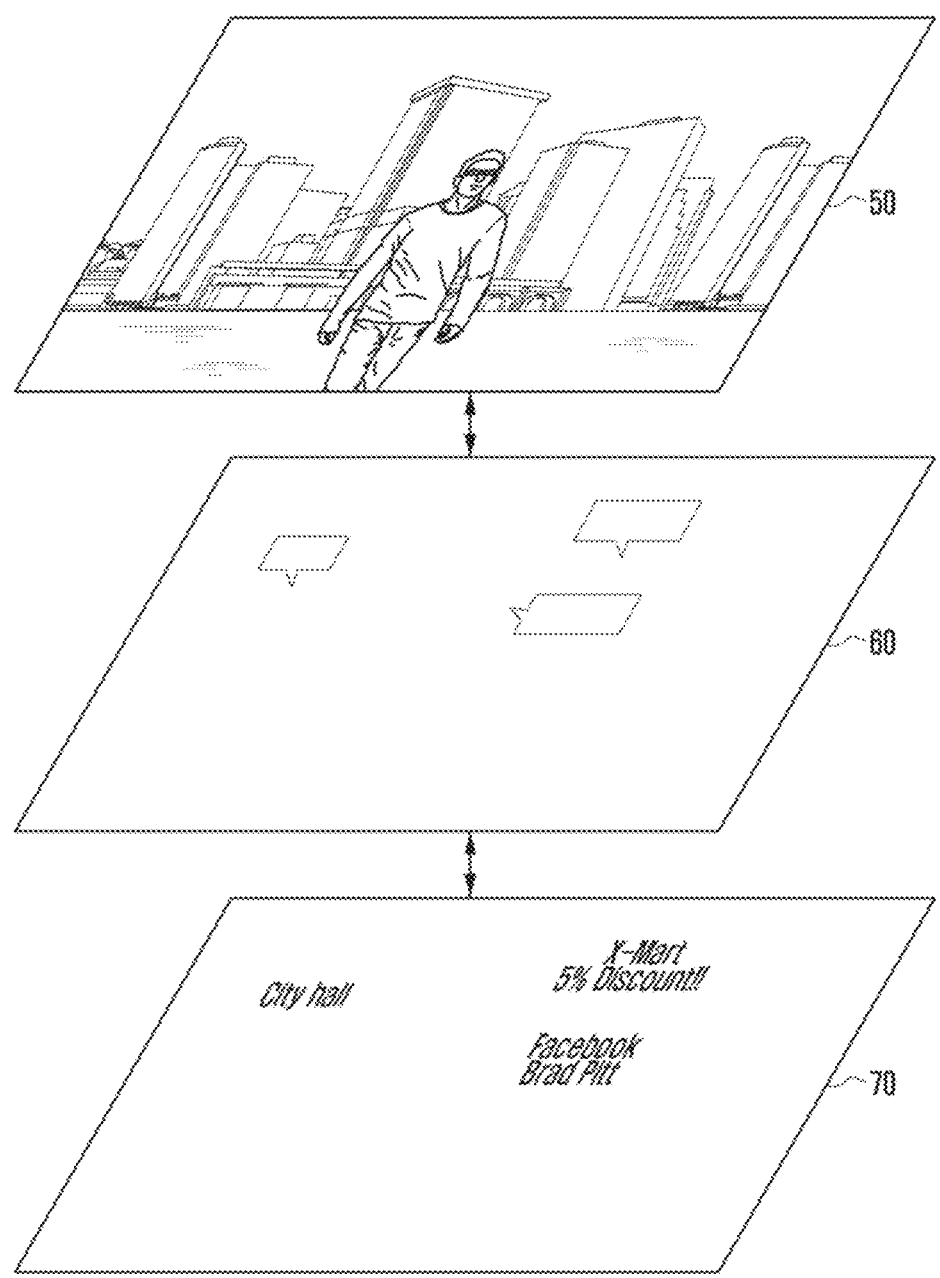
FIG. 12 is a diagram illustrating a principle of creating AR content by combining AR information with an image according to an embodiment of the present disclosure.

FIG. 12 is a diagram illustrating a principle of creating AR content by combining AR information with an image according to an embodiment of the present disclosure.

Referring to FIG. 12, the control unit 150 may load the image 50 of the AR content in response to the display request. Then the control unit 150 may apply the template 60 of the AR content to the image 50. By applying the template 60, the positions and areas (e.g., shape of the area, frame, size, and/or the like) of the AR information are determined on the image 50.

The control unit 150 may also load the context 70 of the AR content corresponding to the template 50. The control unit 150 may combine the loaded context with the corresponding template 60 to generate the final image to be displayed.

Figure 13:
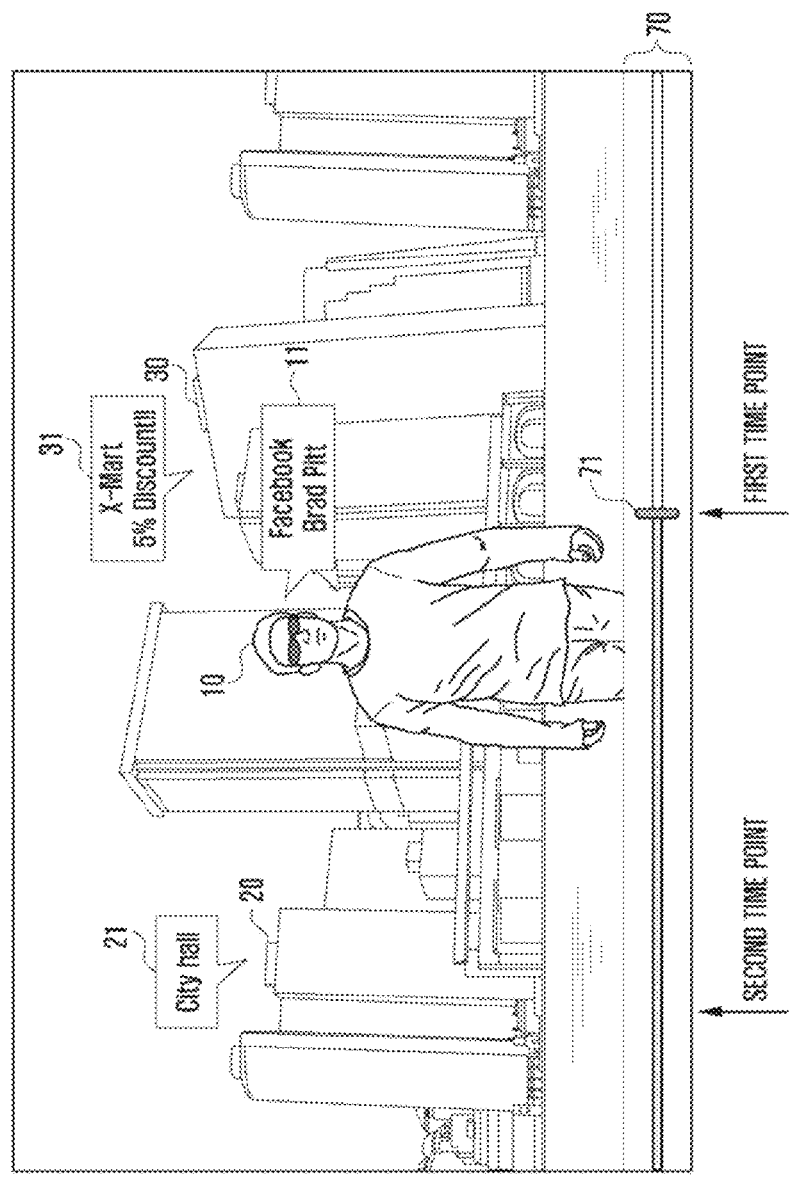
FIG. 13 is a diagram illustrating a screen display of an AR content having a progress bar according to an embodiment of the present disclosure.

The final image acquired by combining the image, template, and context is displayed as illustrated in FIG. 13.

FIG. 13 is a diagram illustrating a screen display of an AR content having a progress bar according to an embodiment of the present disclosure.

Referring to FIG. 13, the control unit 150 may control the display unit 170 to display a progress bar 70 along with the AR content. The progress bar 70 may indicate the progress of the display time of the AR content. The progress bar 70 may display the progress of the current task in a predetermined scale.

The progress bar 70 may be composed of a scroll, a timeline, time scales, and/or the like. FIG. 13 illustrates a progress bar designed in the form of a scroll bar.

In the case that the AR content has been updated more than once before being displayed, the control unit 150 may display the AR content corresponding to a certain time. For example, the control unit 150 may control the display unit 170 to display the AR content updated at the most recent time. The control unit 150 also may control to display an indicator 71 on the progress bar 70 to indicate the time when the AR content has been updated.

Referring to the screen display of FIG. 13, the control unit 150 may display the AR content updated at the first time. In the case, the control unit 150 may place the indicator 71 at the first time on the progress bar.

The control unit 150 also may control the display unit 170 to display the user interface for editing/deleting/managing the AR content along with the AR content.

If a certain information object is selected in the state that the AR content is displayed, then the control unit may display the detailed information of the selected information object. For example, the control unit 150 may control to display a website or application corresponding to the selected information object.

At operation 540, the control unit 150 may monitor to determine whether a specific time AR content display request is detected.

In the case that the displayed AR content has been updated before the display time, the user may want to check the AR content at a time before the update. Accordingly, the user may request for displaying the AR content at a specific time.

According to various embodiments of the present disclosure, the specific time AR content display request may be input by means of the progress bar 70. For example, the user may slide the indicator along the progress bar 70 to the specific time point to request for displaying the AR content at the corresponding time point.

Figure 14:
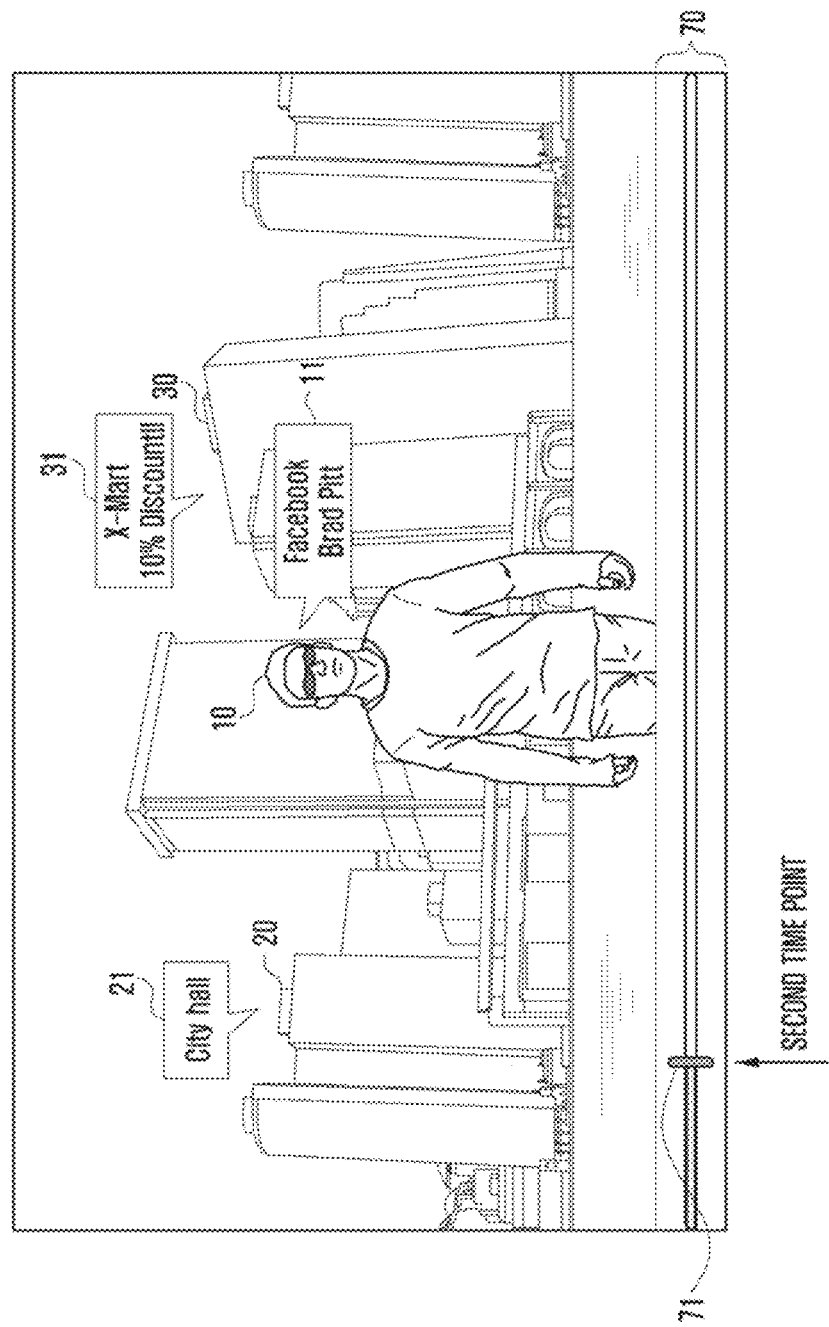
FIG. 14 is a diagram illustrating a screen display of an old version of AR content before update according to an embodiment of the present disclosure.

FIG. 14 is a diagram illustrating a screen display of an old version of AR content before update according to an embodiment of the present disclosure.

Referring to the screen display of FIG. 14, the specific time AR content display request may be input by placing the indicator 71 at the second time point on the progress bar 70.

Upon detection of the request, the control unit 150 may check the information on the specific time point corresponding to the request.

If the control unit 150 determines that a specific time AR content display request is not detected at operation 540, then the control unit may proceed to operation 560.

If the control unit 150 determines that a specific time AR content display request is detected (e.g., if an updated history request is detected) at operation 540, then the control unit 150 may proceed to operation 550 at which the control unit may display the AR content at the time point corresponding to the request.

In the case of updating the AR content according to the procedure of FIG. 9 or 10, the control unit 150 may not delete the old AR contents even after the update. For example, the control unit 150 may store the updated AR content as an updated version of the corresponding AR content.

The control unit 150 may search for the updated version at the time point corresponding to the updated history request. If no update version matching the corresponding time accurately exists, then the control unit 150 may search for the updated version of the AR content which is updated at the time point closest to the corresponding time point.

The control unit 150 may control the display unit 170 to display the found AR content. In detail, the control unit 150 may load the image of the AR content matching the corresponding time point as illustrated in FIG. 12. The control unit 150 may apply the template and context included in the AR content at the corresponding time point to the loaded image to generate the final image to be displayed. The control unit 150 may control the display unit 170 to display the final image.

As illustrated in the screen display of FIG. 13, the control unit 150 may load the AR content corresponding to the second time point. The control unit 150 also may control the display unit 170 to display the AR content matching the second time point. The AR content matching the second time point may include the context different from that of the AR content matching the first time point as illustrated in the screen display of FIG. 14.

At operation 560, the control unit 150 may monitor to determine whether an AR information add request is detected.

The AR information add request may be generated by selecting a user interface, a menu, or an icon corresponding to the add request. The AR information add request also may be generated by selecting a certain object on which AR information is to be added.

If the control unit 150 determines that an AR information add request is not detected at operation 560, then the control unit 150 may proceed to operation 580.

If the control unit 150 determines that the AR information add request is detected at operation 560, then the control unit 150 may proceed to operation 570 at which the control unit 150 may add the AR information corresponding to the request.

Figure 15:
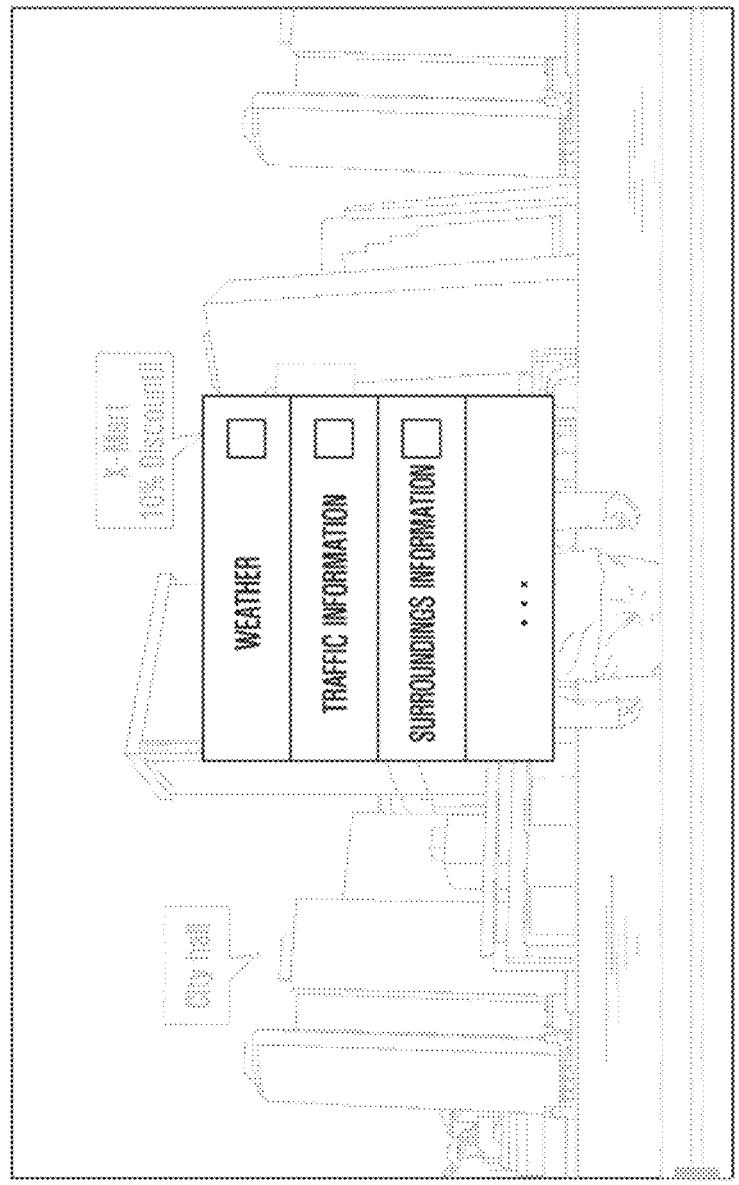
FIG. 15 is a diagram illustrating a screen display showing an AR information list available for AR content according to an embodiment of the present disclosure.

FIG. 15 is a diagram illustrating a screen display showing an AR information list available for the AR content according to an embodiment of the present disclosure.

Referring to FIG. 15, the control unit 150 may display a list of the addable AR information in response to the AR information add request. The AR information list may include the information items of weather, traffic, surroundings, information on the objects in the image, and/or the like as illustrated in FIG. 15. The control unit 150 may receive the selection onto the AR information which the user intends to add from the list.

The control unit 150 may acquire the AR information corresponding to the request of the user. The control unit 150 may request the server for the corresponding information or retrieve the information from the storage unit 160.

Figure 16:
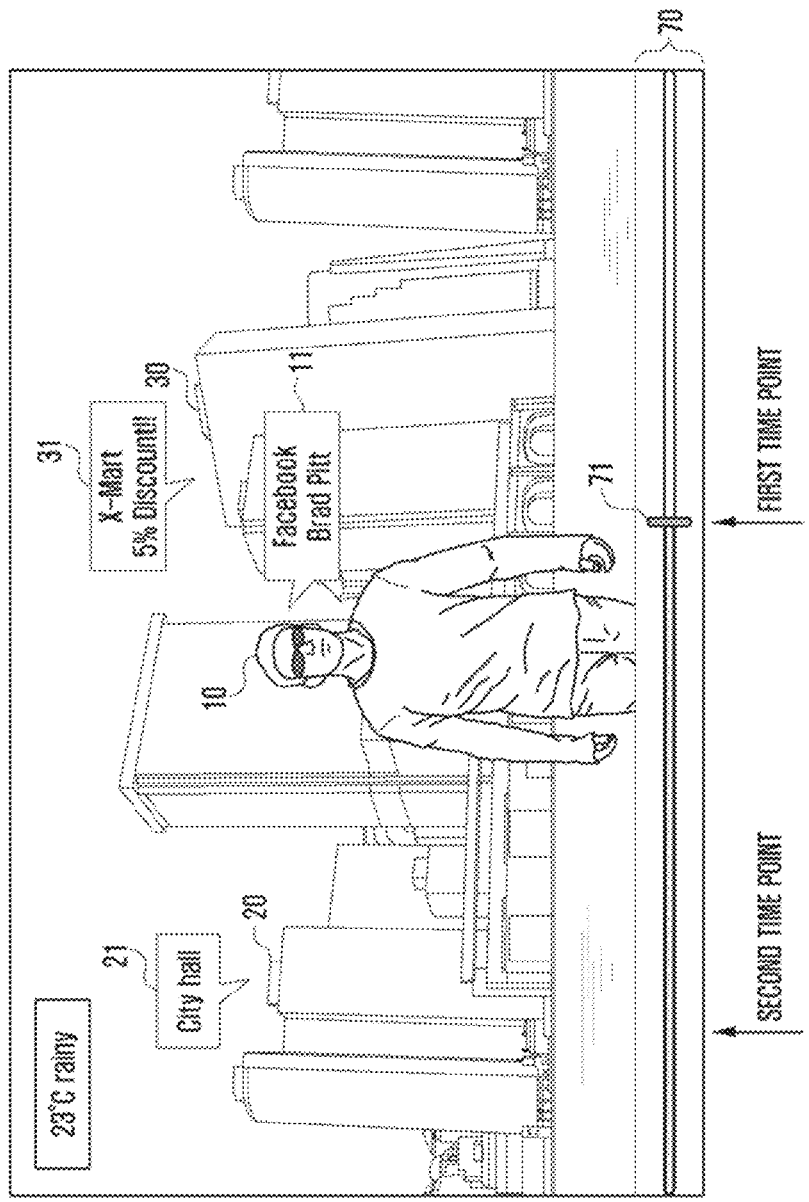
FIG. 16 is a diagram illustrating a screen display of AR content to which supplementary AR information is added according to an embodiment of the present disclosure.

FIG. 16 is a diagram illustrating a screen display of AR content to which supplementary AR information is added according to an embodiment of the present disclosure.

Referring to FIG. 16, the control unit 150 may add the acquired AR information to the template and/or context of the AR content. FIG. 16 illustrates a screen display to which the AR information on the weather is added according to an embodiment of the present disclosure.

At operation 580, the control unit 150 may monitor to determine whether an end request is detected.

If the control unit 150 determines that the end request is not detected at operation 580, then the control unit may return to operation 530.

If the control unit 150 determines that the end request is detected at operation 580, then the control unit 150 may end the AR content display procedure and may display the AR content list, home screen, standby screen, background screen, and/or the like.

As described above, the AR content provision method and apparatus of the present disclosure is advantageous in enriching the interaction between the user and the portable device by updating the AR content continuously.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing content including augmented reality information, the method comprising:
displaying, using a touch sensitive display, a preview image input;
capturing, using a camera, the preview image as an image in response to an augmented reality content creation request received via the touch sensitive display;
recognizing, using a processor electrically connected to the camera and the touch sensitive display, at least one object included in the captured image;
receiving the augmented reality information corresponding to the at least one object;
generating the augmented reality content by combining the image and the augmented reality information;
receiving updated augmented reality information when at least one augmented reality information corresponding to the at least one object is updated;
updating the augmented reality content based on the updated augmented reality information by generating an updated version of the augmented reality content based on the updated augmented reality information and storing information on a time point when the updated version is generated in association with the updated version of the augmented reality content;

displaying a number of updates to the updated version of the augmented reality content;

searching, when a request for an updated version generated at a certain time point is detected, for the updated version matching the certain time point or an updated version at a time point closest to the certain time point;

if the updated version generated at the certain time point is searched, displaying the searched updated version; and if the updated version generated at the certain time point is not searched, displaying an augmented reality information updated at a time point closest to the certain time point.

2. The method of claim 1, wherein the generating of the augmented reality content comprises:

extracting a template and a context of the augmented reality information; and generating the augmented reality content by combining the image with the template and the context.

3. The method of claim 2, wherein the template comprises information on a presenting position of the augmented reality information, and wherein the context corresponds to information on content of the augmented reality information including at least one of image information, webpage information, and application information.

4. The method of claim 2, further comprising:

receiving a request for an augmented reality content display;

combining the augmented reality information onto the image in response to the augmented reality content display request; and displaying the combined augmented reality content and image.

5. The method of claim 1, wherein the receiving of the updated augmented reality information comprises:

requesting, when an update push notifying update of the augmented reality information is received, a server for the updated augmented reality information; and receiving the updated augmented reality information from the server.

6. The method of claim 1, wherein the receiving of the updated augmented reality information comprises:

requesting the server for the updated augmented reality information in response to an augmented reality content display request; and receiving the updated augmented reality information from the server.

7. The method of claim 1, further comprising:

receiving a request for an augmented reality content display;

combining the augmented reality information onto the image in response to the augmented reality content display request; and displaying the combined augmented reality content and image.

8. The method of claim 7, wherein the displaying of the combined augmented reality content and image comprises:

displaying a progress bar showing time progress.

9. The method of claim 1, further comprising:

displaying a list of at least one augmented reality content along with update information on the at least one augmented reality content.

10. The method of claim 1, further comprising:

extracting, when an augmented reality information add request is detected, a template and a context of an augmented reality information corresponding to the augmented reality information add request; and reconfiguring the augmented reality content corresponding to the augmented reality information add request based on the template and the context.

11. An apparatus providing content including augmented reality information, the apparatus comprising:

a camera configured to capture an image;

a memory storing executable instructions;

a display configured to display a preview image captured by the camera and the augmented reality information applied on to the preview image; and a computer processor reading the stored executable instructions which configure the computer processor to:

capture the preview image as an image in response to an augmented reality content creation request, recognize at least one object included in the captured image, receive the augmented reality information corresponding to the at least one object, and generate the augmented reality content by combining the image and the augmented reality information, wherein the computer processor updates the augmented reality content based on updated augmented reality information, when updated augmented reality information is received, wherein the updated augmented reality information is received when at least one augmented reality information corresponding to the at least one object is updated, and wherein the computer processor is further configured to:

acquire, when an update event occurs for the augmented reality content, updated augmented reality information, generate an updated version of the augmented reality content based on the updated augmented reality information along with information on a time point when the updated version is generated, display a number of updates to the updated version of the augmented reality content;

search, when a request for an update version generated at a certain time point is detected, for the update version matching the certain time point or an updated version at a time point closest to the certain time point, if the updated version generated at the certain time point is searched, control the display to display the updated version of the augmented reality content matching the certain time point, and if the updated version generated at the certain time point is not searched, control the display to display an augmented reality information updated at a time point closest to the certain time point.

12. The apparatus of claim 11, wherein the computer processor is further configured to:

extract a template and a context of the augmented reality information, and generate the augmented reality content by combining the image with the template and the context.

13. The apparatus of claim 12, wherein the template comprises information on a presenting position of the augmented reality information, and wherein the context corresponds to information on content of the augmented reality information including at least one of image information, webpage information, and application information.

14. The apparatus of claim 12, wherein the computer processor is further configured to:
  combine the template and context onto the image in response to an augmented reality content display request, and
  control the display to display the combination result.

15. The apparatus of claim 14, wherein the control unit is further configured to control the display unit to display a progress bar showing time progress along with the augmented reality content.

16. The apparatus of claim 11, further comprising:
a transceiver configured to communicate with a server,
wherein the computer processor is further configured to:
  control the transceiver to request, when an update push notifying update of the augmented reality information is received, the server for the updated augmented reality information, and
  update the augmented reality content based on the updated augmented reality information received from the server.

17. The apparatus of claim 11, further comprising:
a transceiver configured to communicate with a server,
wherein the computer processor is further configured to:
  control the transceiver to request the server for the updated augmented reality information in response to an augmented reality content display request, and
  update the augmented reality content based on the updated augmented reality information received from the server.

18. The apparatus of claim 11, wherein the computer processor is further configured to:
  extract, when an augmented reality information add request is detected, a template and a context based on the augmented reality information corresponding to the augmented reality information add request, and
  reconfigure the augmented reality content corresponding to the augmented reality information add request based on the template and the context.

* * * * *